(12) United States Patent  (10) Patent No.: US 9,056,645 B2
Jurek  (45) Date of Patent: Jun. 16, 2015

(54) FOLDING BICYCLE

(75) Inventor: Marek Jurek, Warsaw (PL)

(73) Assignee: IZZYBIKE MAREK JUREK, Warsaw (PL)

( * ) Notice: Subject to any disclaimer, the term of this patent is extended or adjusted under 35 U.S.C. 154(b) by 0 days.

(21) Appl. No.: 14/008,540

(22) PCT Filed: Mar. 29, 2012

(86) PCT No.: PCT/PL2012/000019
§ 371 (c)(1),
(2), (4) Date: Oct. 25, 2013

(87) PCT Pub. No.: WO2012/134309
PCT Pub. Date: Oct. 4, 2012

(65) Prior Publication Data
US 2014/0035254 A1   Feb. 6, 2014

(30) Foreign Application Priority Data
Apr. 1, 2011  (PL) .......................................... 394406

(51) Int. Cl.
| | |
|---|---|
| B62K 15/00 | (2006.01) |
| B62K 3/00 | (2006.01) |
| B62K 13/02 | (2006.01) |
| B62K 21/00 | (2006.01) |
| B62K 21/18 | (2006.01) |
| B62M 1/38 | (2013.01) |

(52) U.S. Cl.
CPC ............... B62K 15/008 (2013.01); B62K 3/005 (2013.01); B62K 13/02 (2013.01); B62K 15/006 (2013.01); B62K 21/00 (2013.01); B62K 21/18 (2013.01); B62M 1/38 (2013.01)

(58) Field of Classification Search
CPC ....... B62K 15/006; B62K 21/00; B62K 21/18
USPC .......................................... 280/200, 278, 287
See application file for complete search history.

(56) References Cited

U.S. PATENT DOCUMENTS

| | | | | |
|---|---|---|---|---|
| 477,583 | A | * | 6/1892 | Van Bibber .................... 280/270 |
| 629,179 | A | * | 7/1899 | Stephens ........................ 280/270 |
| 2,147,732 | A | * | 2/1939 | Boynton ........................ 280/261 |
| 3,374,009 | A | * | 3/1968 | Jeunet ............................ 280/287 |

(Continued)

FOREIGN PATENT DOCUMENTS

| | | |
|---|---|---|
| PL | 292655 A1 | 6/1993 |
| PL | 344428 A1 | 6/2001 |

(Continued)

*Primary Examiner* — Joseph Rocca
*Assistant Examiner* — Conan Duda
(74) *Attorney, Agent, or Firm* — Browdy and Neimark, PLLC

(57) ABSTRACT

A bicycle with a drive on a front wheel, which after the handlebar is turned relative to the front wheel frame, has reduced overall dimensions and can be easily adjusted to be ridden by two persons. The bicycle frame includes the front wheel frame and the rear wheel frame coupled together by a joint and a crossed line transmission, with a fixed seat and back-rest. The axis of the joint intersects the floor at a point spaced behind the point of contact of the front wheel with the floor. The handlebar is mounted rotationally in a swivel axle of the front wheel frame. The small wheel of the transmission is immovably fixed to the rear wheel frame in the axis of the joint, and the big wheel of the transmission is immovably joined through the swivel axle with the handlebar and rotates about the axis of the swivel axle.

11 Claims, 2 Drawing Sheets

(56) References Cited

U.S. PATENT DOCUMENTS

| | | | |
|---|---|---|---|
| 3,910,599 A | 10/1975 | Thomas | |
| 4,182,522 A * | 1/1980 | Ritchie | 280/278 |
| 5,485,893 A * | 1/1996 | Summers | 180/219 |
| 6,588,786 B2 * | 7/2003 | Efflandt, Sr. | 280/261 |
| 6,629,574 B2 * | 10/2003 | Turner | 180/206.4 |
| 6,634,251 B2 * | 10/2003 | Chen | 74/492 |
| 6,845,997 B2 * | 1/2005 | Chou | 280/278 |
| 7,198,281 B2 * | 4/2007 | Huang | 280/278 |
| 2002/0185826 A1 * | 12/2002 | Chen et al. | 280/1 |
| 2004/0007850 A1 * | 1/2004 | Crozet et al. | 280/280 |
| 2009/0289434 A1 * | 11/2009 | Lin | 280/278 |

FOREIGN PATENT DOCUMENTS

| | | |
|---|---|---|
| PL | 354284 A1 | 12/2003 |
| PL | 377279 A1 | 4/2007 |
| WO | WO-9501276 A2 | 1/1995 |

* cited by examiner

FOLDING BICYCLE

FIELD

The subject of the invention is a bicycle with a drive on at least a front wheel.

BACKGROUND

Construction of this bicycle makes possible to considerably and very quickly decrease its overall dimensions and to adjust it easily for two persons.

The bicycles with the drive on the front wheel have been known for long time (SHIRE & BONESHAKER 1870, or DEKSTER 1869), and the functionality of the overall dimensions reduction have been realised in many ways.

In known bicycles, the functionality of folding is realised most often by use of additional constructional elements. The bicycle known from Polish application 17.344428 is, for example, fitted with additional joints, making it possible to "break" the bicycle in the locations of junctions of the frame beams and in the handlebar plane. Introduction of such additional elements is troublesome because it lengthens the time for preparation of the bicycle for driving, and increases its weight and cost.

A folding bicycle is known as well from Polish application P.354284. In this bicycle, a rear rocker is joined to the end of the frame through a telescopic suspension of the rear wheel. Front and rear wheels are joined to front and rear rockers, respectively. Telescopic elastic suspension of front wheel, rail suspension of rear wheel, the handlebar axle and the treadles with cranks are fitted with quick releases. The functionality of folding is realised in this bicycle also through the use of additional elements.

Also from Polish application P.292655 a bicycle is known with a rhomboidal frame cut along the shorter diagonal, where these cuts are subsequently removably joined with articulated locks. The bicycle is folded by releasing of the locks on the frame.

A bicycle with a rear drive is known from Polish application P.377279, where the axis of the handlebar fixed to the frame runs through the point of intersection of the front wheel with the floor, and the angle made by this axis with the floor equals about 70°.

To summarize, all known constructions of bicycles with the functionality of folding require usage of additional elements.

SUMMARY

The aim of the invention is to propose a bicycle construction that makes possible easy, fast (less than 1 sec.) assembly, and considerable reduction of its overall dimensions. The construction should be light, comfortable, easy to keep clean, with good driving qualities, and make possible easy adjustment for two persons.

The subject of the invention is a bicycle with a drive on front wheel, which after turning the handlebar by cca 110° relative to the frame of the front wheel, considerably reduces its overall dimensions and which can be easily adjusted to be ridden by two persons.

The bicycle according to the invention has wheels joined by the frame beams, a handlebar, a seat and a drive. In this bicycle, the frame consists of the frame of the front wheel fitted with the driving system with an axis of rotation comprised within this wheel, and the rear wheel frame, with a fixed seat and a fixed back-rest. Both frames are coupled by a joint and a crossed line transmission. In this coupling, the axis of the joint is common to both frames and intersects the floor surface at an angle of between 66° and 72°, at a distance of between 16 cm and 24 cm behind the point of contact of the front wheel with the floor. According to the invention, the rear wheel may also be fitted with the driving system, like the front wheel. The driving system applied is placed on the axis of driven wheel and it is a treadle crank system. A one-way clutch and planetary transmission, preferably an automatic variable ratio transmission, are placed on an axis of rotation of the driven wheel. The handlebar is fixed rotationally in a swivel axle of the front wheel frame and is immovably joined through the swivel axle with the big wheel of the crossed line transmission. The swivel axle of the front wheel frame has two bearings, where the bearing close to the handlebar has a small friction momentum, preferably a ball bearing, while the bearing at the big wheel of the crossed line transmission is a transverse slide bearing with a large friction momentum.

The ratio of the crossed line transmission equals to a range between 1.3:1 and 1.5:1. The small wheel of this transmission is immovably fixed to the rear wheel frame in an axis of the joint that couples both frames, and the big wheel of the transmission is immovably joined with the handlebar. The big wheel of the transmission rotates in the axis of the swivel axle of the front wheel frame.

The line joining both wheels of the transmission is crossed between the big wheel and the relief rollers placed close to big wheel of the transmission.

The bicycle according to the invention is comfortable, easy to maintain and is characterized by a low failure frequency. It has good driving qualities and is characterized with little impact of changing forces during pedalling on the steering system. It may be easily adjusted for two persons and quickly reduced in overall dimensions.

BRIEF DESCRIPTION OF THE DRAWINGS

The invention is explained in preferred embodiments shown on the drawings, in which.

DETAILED DESCRIPTION

Figure 2:
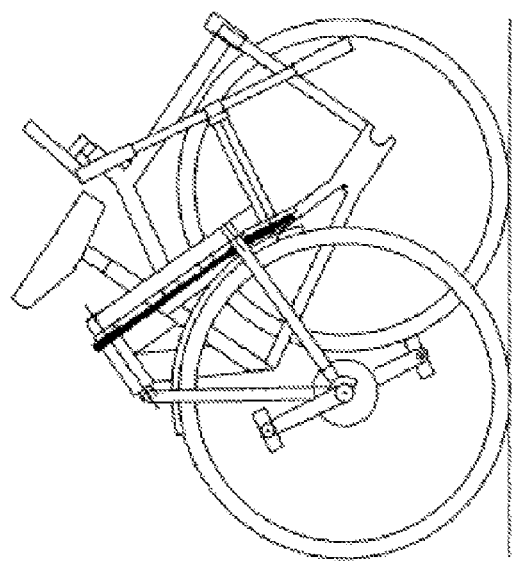
FIG. 2 shows this bicycle after reduction of overall dimensions.
Figure 1:
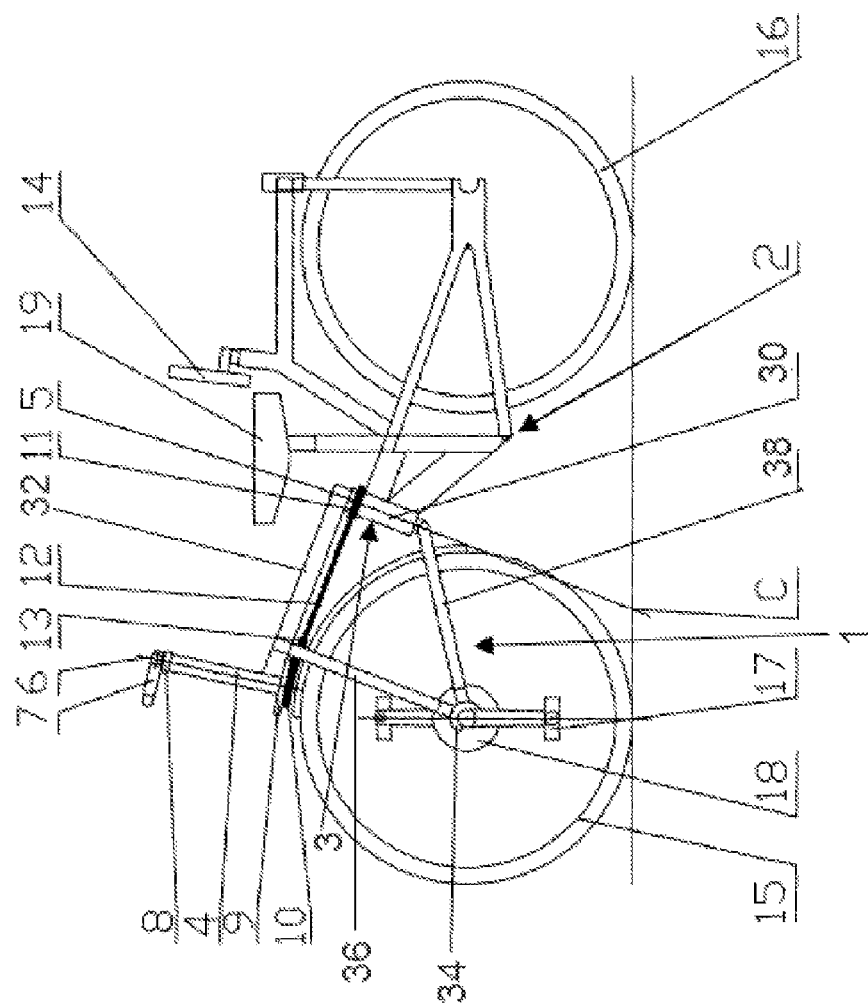
FIG. 1 shows a single-seat bicycle.
Figure 4:
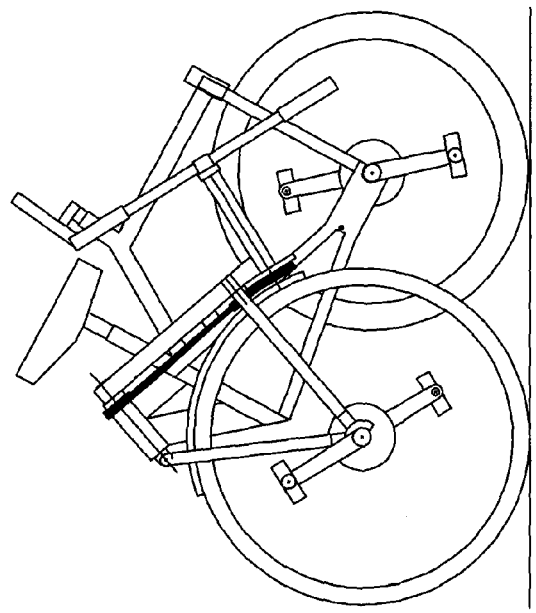
FIG. 4 shows the bicycle for two persons in folded state.

The bicycle has a front wheel (15) with a diameter of 28 inches, and a rear wheel (16) also with a diameter of 28 inches. The wheels are coupled with a combined frame consisting of a frame (1), alternatively referred to as a front wheel frame, for the front wheel (15) and a frame (2), alternatively referred to as the rear wheel frame, for the rear wheel (16). The frames (1) and (2) are coupled by a joint (3), which forms an arm (30) of both frames. The frame (1) includes a cross bar (32) connected between the swivel axle and a first end of the joint, an axle connector (34) that connects with the front wheel, a front bar (36) connected between the cross bar and the axle connector, and a bottom cross bar (38) connected between the axle connector and a second end of the joint. The frames (1) and (2) are also coupled by a crossed line transmission with a ratio of 1.4:1. The crossed line transmission comprises a big wheel (10), a small wheel (11) and a line (12). The frame (1) has a swivel axle (4) with a handlebar (7) fixed rotationally around an axis (6). The swivel axle (4) with the fixed handlebar (7) has two bearings (8) and (9). The bearing (8) is placed close to the handlebar (7) and it is a common ball bearing. The bearing (9) is placed close to the big wheel (10)

of the crossed line transmission. The bearing (9) is a transverse slide bearing with a high friction momentum. The handlebar (7) is immovably joined through the swivel axle (4) with the big wheel (10) of the crossed line transmission. This transmission has a ratio of 1.4:1 and its small wheel (11) is fixed immovably on the axis (5) of the joint (3) joining the frames (1) and (2).

If the handlebar (7) turns against the frame (1), it causes the frame (1) to turn relative to the frame (2).

The bearing (9) of the swivel axle (4) is relieved with use of two relief rollers (13) in case of equal line tension on both sides of the transmission. The rollers (13) are placed close to the wheel (10) of the crossed transmission, and the line (12) of the line transmission crosses between the big wheel (10) and the rollers (13). The difference of the line (12) tensions on both sides of the transmission made by the frame (1) turning relative to the frame (2), without the handlebar turning relative to the frame (2), generates on both sides of the transmission proportional friction momentum in the bearing (9), which restrains movement of the frame (1) relative to the frame (2).

If by turning the handlebar (7) relative to the frame (1), one generates a difference in the line (12) tension on both sides of the transmission, the momentum of force applied to the handlebar relative to the rotation axis (5) of the joint (3) compensates for this difference in tension, making possible to turn the handlebar easily.

The front wheel of the bicycle is driven by the crank drive system (18) with the treadles (17). The drive system consists of a one-way clutch and a planetary transmission, placed on the axis of rotation of the wheel (15).

In a preferred embodiment, the longitudinal axis (5) of the joint (3), which is a part common to both frames (1) and (2), intersects the floor surface at the point (C) at an angle of 69°, and the distance of this point from the point of contact of the first wheel (15) with the floor equals 20 cm.

Figure 3:
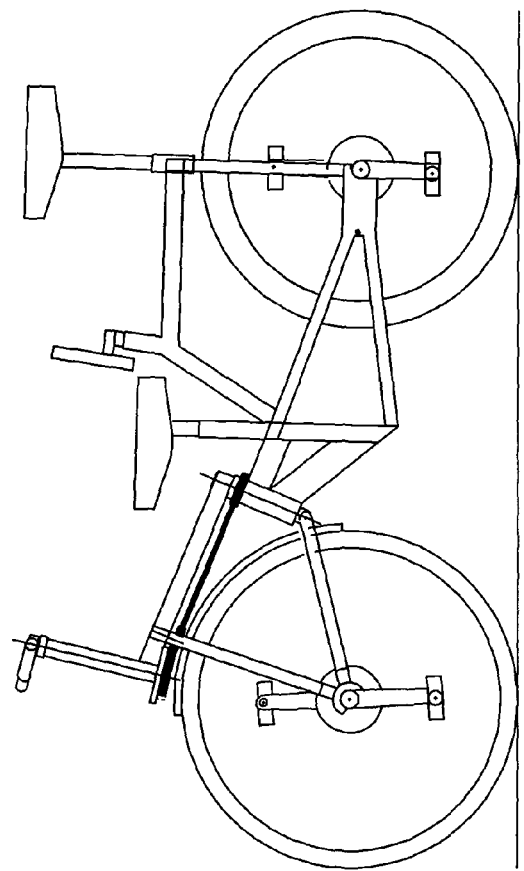
FIG. 3 shows a bicycle for two persons.

In the beam of the frame (2) of the rear wheel, the seat (19) is mounted, fitted with the back-rest (14). On this beam, behind the back-rest (14), a second seat may be mounted, if the bicycle is to be reconfigured for two persons (FIG. 3). This embodiment requires also replacing the rear wheel (16), preferably with a wheel 26 inches in diameter, with the crank drive similar to that in the front wheel.

The invention claimed is:

1. A bicycle fitted with a front wheel, a rear wheel, and a crank drive system which is installed at least on the front wheel, the bicycle comprising:
   a front wheel frame having the front wheel disposed thereon, and
   a rear wheel frame having the rear wheel disposed thereon, the rear wheel having a diameter of at least 26 inches,
   a joint common to the front wheel frame and the rear wheel frame and forming an arm of both the front wheel frame and the rear wheel frame, the joint having a longitudinal axis, the front frame being rotatable about the longitudinal axis to collapse and fold the bicycle,
   the front wheel frame comprising a swivel axle, a fixed handlebar joined rigidly through the swivel axle, a cross bar connected between the swivel axle and a first end of the joint, an axle connector that connects with the front wheel, a front bar connected between the cross bar and the axle connector, a bottom cross bar connected between the axle connector and a second end of the joint,
   a crossed line transmission having a first transmission wheel rotationally and rigidly connected to the fixed handlebar, a second transmission wheel rotationally and rigidly connected to the joint, and a line connecting the first transmission wheel to the second transmission wheel,
   the rear wheel frame being fitted with at least one seat with a back-rest, and
   wherein the front wheel and rear wheel frames are coupled together by the joint and the crossed line transmission such that the longitudinal axis of the joint intersects a floor at a point at an angle ranging between 66° and 72°, at a distance between 16 cm and 24 cm from a point of contact of the front wheel with the floor.

2. The bicycle according to claim 1, further comprising a drive system for driving a driven wheel, the driven wheel comprising one of either the front wheel or the rear wheel and a rotation axis of the drive system being disposed inside the driven wheel.

3. The bicycle according to claim 1, wherein the swivel axle on which the handlebar is rotationally mounted, has a first bearing and a second bearing, where the first bearing is placed close to the handlebar and the second bearing is placed close to a first transmission wheel.

4. The bicycle according to claim 3, wherein the first transmission wheel rotates on the longitudinal axis of the swivel axle, and the line joining the first and the second transmission wheels of the crossed line transmission crosses between the first transmission wheel and two relief rollers placed close to the first transmission wheel.

5. The bicycle according to claim 1, wherein the crossed line transmission has a ratio in a range of 1.3:1 to 1.5:1.

6. The bicycle according to claim 2, wherein the rotation axis of the drive system is placed on the rotation axis of the driven wheel.

7. The bicycle according to claim 3, wherein the first bearing is a ball bearing.

8. The bicycle according to claim 3, wherein the second bearing is a slide bearing.

9. The bicycle according to claim 2, wherein the driven wheel is the front wheel.

10. The bicycle according to claim 2, wherein the driven wheel is the rear wheel.

11. The bicycle according to claim 10, further comprising a second seat removably mounted on a beam of the rear wheel frame.

* * * * *